United States Patent
Wu et al.

(10) Patent No.: US 12,476,753 B2
(45) Date of Patent: Nov. 18, 2025

(54) INFORMATION TRANSMISSION METHOD, NETWORK SIDE DEVICE AND TERMINAL DEVICE

(71) Applicant: VIVO MOBILE COMMUNICATION CO., LTD., Guangdong (CN)

(72) Inventors: Kai Wu, Guangdong (CN); Ye Si, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 687 days.

(21) Appl. No.: 17/587,146

(22) Filed: Jan. 28, 2022

(65) Prior Publication Data

US 2022/0158791 A1    May 19, 2022

Related U.S. Application Data

(63) Continuation of application No. PCT/CN2020/105134, filed on Jul. 28, 2020.

(30) Foreign Application Priority Data

Jul. 31, 2019  (CN) .......................... 201910701053.9

(51) Int. Cl.
*H04W 72/12* (2023.01)
*H04L 1/00* (2006.01)
(Continued)

(52) U.S. Cl.
CPC .......... *H04L 5/0048* (2013.01); *H04L 1/0068* (2013.01); *H04L 27/2602* (2013.01); *H04W 72/23* (2023.01)

(58) Field of Classification Search
CPC . H04L 5/0048; H04L 1/0068; H04L 27/2602; H04L 5/0094; H04L 27/0006;
(Continued)

(56) References Cited

U.S. PATENT DOCUMENTS 10,477,535 B2 * 11/2019 Yang ........................ H04W 4/70
11,695,459 B2 *  7/2023 Khoryaev ............ H04B 7/0617
                                                                375/267
(Continued)

FOREIGN PATENT DOCUMENTS

CN       104010363 A    8/2014
CN       106301737 A    1/2017
(Continued)

OTHER PUBLICATIONS

Ericsson et al: "Draft CR 36.21", 3rd Generation Partnership Project (3GPP), Jul. 7, 2009.

(Continued)

*Primary Examiner* — Jay P Patel
(74) *Attorney, Agent, or Firm* — IP & T GROUP LLP

(57) ABSTRACT

An information transmission method includes: mapping a PDSCH and a positioning reference signal PRS onto different resource elements REs of a same RB; or mapping the PDSCH and the PRS onto different RBs; or mapping the PDSCH and the PRS onto different OFDM symbols; and transmitting the PDSCH and the PRS to a terminal device.

17 Claims, 2 Drawing Sheets

(51) Int. Cl.
  *H04L 5/00* (2006.01)
  *H04L 27/26* (2006.01)
  *H04W 72/23* (2023.01)

(58) Field of Classification Search
  CPC ... H04L 5/0007; H04L 5/0044; H04L 5/0053; H04W 72/23
  See application file for complete search history.

(56) References Cited

U.S. PATENT DOCUMENTS

| | | | |
|---|---|---|---|
| 11,758,503 B2* | 9/2023 | Si | H04L 27/2613 370/329 |
| 11,963,194 B2* | 4/2024 | Yang | H04L 27/0006 |
| 2012/0093101 A1 | 4/2012 | Dai et al. | |
| 2013/0294391 A1 | 11/2013 | Guo et al. | |
| 2013/0294401 A1* | 11/2013 | Yoon | H04W 72/541 370/329 |
| 2015/0208392 A1* | 7/2015 | Park | H04W 72/23 370/329 |
| 2016/0043849 A1* | 2/2016 | Lee | H04L 5/0053 370/329 |
| 2017/0111880 A1* | 4/2017 | Park | H04W 64/00 |
| 2017/0251454 A1* | 8/2017 | Yang | H04W 52/146 |
| 2017/0374640 A1* | 12/2017 | Kim | G01S 1/042 |
| 2019/0014572 A1 | 1/2019 | Chmiel et al. | |
| 2019/0182085 A1 | 6/2019 | Nory et al. | |
| 2019/0387501 A1 | 12/2019 | Park et al. | |
| 2020/0014487 A1* | 1/2020 | Akkarakaran | H04L 5/0048 |
| 2020/0305129 A1* | 9/2020 | Lee | H04L 1/1861 |
| 2021/0120519 A1* | 4/2021 | Si | H04L 5/0048 |
| 2022/0026517 A1* | 1/2022 | Hasegawa | G01S 7/003 |
| 2022/0046694 A1* | 2/2022 | Park | H04W 72/04 |
| 2022/0116089 A1* | 4/2022 | Khoryaev | H04W 64/00 |
| 2022/0200773 A1* | 6/2022 | Alriksson | H04L 5/0094 |
| 2022/0304039 A1* | 9/2022 | Jiang | H04W 72/23 |
| 2023/0300849 A1* | 9/2023 | Park | H04W 72/0453 370/329 |
| 2024/0129930 A1* | 4/2024 | Lee | H04W 72/23 |

FOREIGN PATENT DOCUMENTS

| | | |
|---|---|---|
| CN | 107534545 A | 1/2018 |
| CN | 109863810 A | 6/2019 |
| WO | 2017/057989 A1 | 4/2017 |
| WO | 2018/093835 A1 | 5/2018 |

OTHER PUBLICATIONS

EESR issued by the EPO for EP 20848621 mailed on Aug. 2, 2022.
RE mapping for ePDCCH in presence of other channels and signals, 3GPP TSG RAN WG1 Meeting #70, Aug. 13-17, 2012, p. 1-3, R1-123429, New Postcom, Qingdao, China.
The First Office Action of Priority Application No. CN 201910701053.9 issued by the Chinese Patent Office on Mar. 11, 2021.
International Search Report and Written Opinion of International Application No. PCT/CN2020/105134 issued by the Chinese Patent Office on Sep. 29, 2020.

* cited by examiner

INFORMATION TRANSMISSION METHOD, NETWORK SIDE DEVICE AND TERMINAL DEVICE

CROSS-REFERENCE TO RELATED APPLICATIONS

This application is a Bypass Continuation Application of PCT/CN2020/105134 filed on Jul. 28, 2020, which claims priority to Chinese Patent Application No. 201910701053.9 filed on Jul. 31, 2019, which are incorporated herein by reference in their entirety.

TECHNICAL FIELD

The present disclosure relates to the field of communications technologies, and in particular, to an information transmission method, a network side device and a terminal device.

BACKGROUND

Wireless spectrum resources are uniformly allocated by a country for use, and a wireless spectrum is divided into two parts: a licensed frequency band (LFB) and an unlicensed frequency band (UFB). In a future communications system, the UFB can be used as a supplement to the LFB to help operators expand their services.

On the UFB, a positioning reference signal (PRS) and a physical downlink shared channel (PDSCH) may be mapped onto a same resource block (RB), and consequently, the PDSCH and the PRS cannot be multiplexed.

SUMMARY

According to a first aspect, an embodiment of the present disclosure provides an information transmission method. The method includes:
mapping a PDSCH and a PRS onto different resource elements (RE) of a same RB; or mapping the PDSCH and the PRS onto different RBs; or mapping the PDSCH and the PRS onto different orthogonal frequency division multiplexing (OFDM) symbols; and
transmitting the PDSCH and the PRS to a terminal device.

According to a second aspect, an embodiment of the present disclosure provides an information transmission method. The method includes:
receiving a PDSCH and a PRS transmitted by a network side device, where the PDSCH and the PRS are mapped onto different REs of a same RB; or the PDSCH and the PRS are mapped onto different RBs; or the PDSCH and the PRS are mapped onto different OFDM symbols.

According to a third aspect, an embodiment of the present disclosure provides an information transmission apparatus. The apparatus includes:
a mapping module, configured to map a PDSCH and a PRS onto different REs of a same RB; or map the PDSCH and the PRS onto different RBs; or map the PDSCH and the PRS onto different OFDM symbols; and
a transmission module, configured to transmit the PDSCH and the PRS to a terminal device.

according to a fourth aspect, an embodiment of the present disclosure provides an information transmission apparatus. The apparatus includes:
a receiving module, configured to receive a PDSCH and a PRS transmitted by a network side device, where the PDSCH and the PRS are mapped onto different REs of a same RB; or the PDSCH and the PRS are mapped onto different RBs; or the PDSCH and the PRS are mapped onto different OFDM symbols.

According to a fifth aspect, an embodiment of the present disclosure provides a network side device. The network side device includes a memory, a processor, and a computer program stored in the memory and executable on the processor, where
when the processor executes the computer program, the information transmission method provided in the first aspect of the embodiments of the present disclosure is implemented.

According to a sixth aspect, an embodiment of the present disclosure provides a terminal device. The terminal device includes a memory, a processor, and a computer program stored in the memory and executable on the processor, where
when the processor executes the computer program, the information transmission method provided in the second aspect of the embodiments of the present disclosure is implemented.

According to a seventh aspect, an embodiment of the present disclosure provides a non-transitory computer-readable storage medium. The non-transitory computer-readable storage medium stores a computer program. When the computer program is executed by a processor, the information transmission method provided in the first aspect of the embodiments of the present disclosure is implemented, or the information transmission method provided in the second aspect of the embodiments of the present disclosure is implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from the accompanying drawings.

DESCRIPTION OF EMBODIMENTS

To make the invention objectives, technical solutions, and beneficial technical effects of the present disclosure clearer, the following describes the present disclosure in detail with reference to specific embodiments of the present disclosure. It should be understood that the embodiments described in this specification are merely intended to explain the present disclosure, but not to limit the present disclosure.

For ease of description, only some numerical ranges are explicitly disclosed in this specification. However, any lower limit may be combined with any upper limit to form a range that is not explicitly specified, any lower limit may be combined with another lower limit to form a range that is not explicitly specified, and likewise, any upper limit may be combined with any other upper limit to form a range that is not explicitly specified. In addition, although not explicitly specified, each point or single value between end points of a range is included in the range. Therefore, each point or single numerical value can be used as its lower limit or upper limit to be combined with any other point or single numerical value, or to be combined with another lower or upper limit to form a range that is not explicitly specified.

In the description of this specification, it should be noted that, unless otherwise specified, a number defined by "above" and "below" includes the number itself, and the meaning of "more" in "one or more" means two or more than two.

The summary of the present disclosure is not intended to describe all disclosed embodiments or all implementations of the present disclosure. The following description describes example embodiments with more details. In many parts throughout this application, guidance is provided through a series of embodiments, which can be used in various combinations. In each embodiment, the listed items merely serve as a representative group and should not be construed as an exhaustive list.

On an unlicensed frequency band UFB, a PRS and a PDSCH may be mapped onto a same RB, and consequently, it is possible that the PDSCH and the PRS cannot be multiplexed. In view of this, an embodiment of the present disclosure provides an information transmission method, an apparatus, a device and a medium, so that a PDSCH and a PRS can be multiplexed. The following first introduces the information transmission method provided by an embodiment of the present disclosure.

Figure 1:
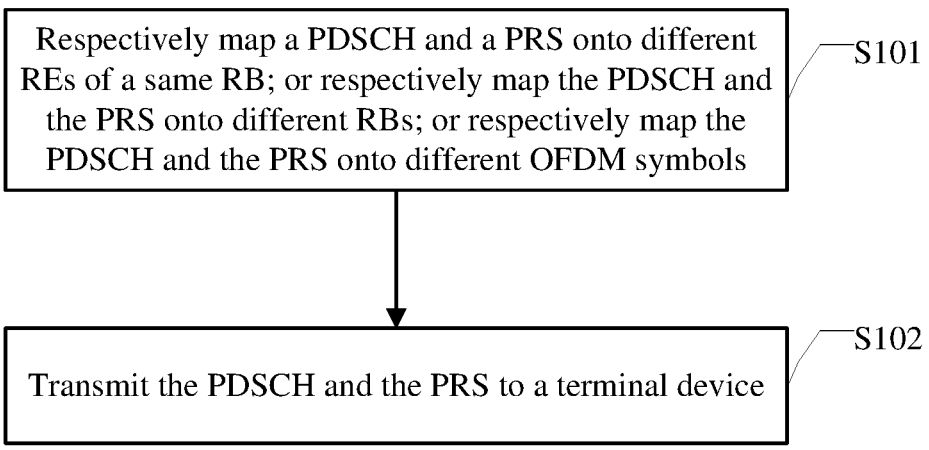
FIG. 1 shows a schematic flowchart of an information transmission method applied to a network side device according to an embodiment of the present disclosure.

An embodiment of the present disclosure provides an information transmission method applied to a network side device. FIG. 1 shows a schematic flowchart of an information transmission method applied to a network side device according to an embodiment of the present disclosure. The information transmission method applied to the network side device may include:

S101. Map a PDSCH and a PRS onto different REs of a same RB; or map the PDSCH and the PRS onto different RBs; or map the PDSCH and the PRS onto different OFDM symbols.

S102. Transmit the PDSCH and the PRS to a terminal device.

The network side device provided in this embodiment of the present disclosure may be a base station, and the base station may be a commonly used base station, or may be an evolved nodeB (eNB), or may be a device such as a network side device (for example, a next generation nodeB (gNB) or a transmission and reception point (TRP)) or a cell in a 5G system, or may be a network side device in a subsequent evolved communications system. However, the foregoing words do not constitute a limitation on the protection scope of the present disclosure. In some embodiments, the terminal device may be a mobile phone, a tablet computer, a smart watch, a smart home appliance, or the like, which is not limited in this embodiment of the present disclosure.

Optionally, the information transmission method applied to the network side device and provided in this embodiment of the present disclosure may be applicable to a UFB.

The resource element RE is usually also referred to as a resource unit or resource particle.

In an embodiment of the present disclosure, transmission content of the PDSCH may include at least one of remaining minimum system information (RMSI), other system information (OSI), a paging message, a random access response (RAR), or fourth signaling MSG4 in contention-based random access.

According to the information transmission method in this embodiment of the present disclosure, a PDSCH and a PRS are mapped onto different REs of a same RB; or the PDSCH and the PRS are mapped onto different RBs; or the PDSCH and the PRS are mapped onto different OFDM symbols, so that the PDSCH and the PRS can be multiplexed.

In an embodiment of the present disclosure, the network side device may further transmit downlink control information (DCI) to the terminal device, wherein the DCI is used to instruct the terminal device to perform rate matching or puncturing on an RE or an RB or an OFDM symbol of the PRS.

In time-frequency resources allocated for the PDSCH, REs are mapped first in frequency domain and then time domain one by one. These REs exclude RE resources such as a demodulation reference signal (DMRS) and a channel state information reference signal (CSI-RS). Rate matching means skipping a PRS resource (RE or RB or OFDM symbol) for mapping during a mapping process. Punching means that a PDSCH is mapped still according to an original mapping rule, but PDSCH transmission is not performed for an RE on a PRS resource (RE or RB or OFDM symbol). In the manner of rate matching or puncturing, this resource can be reserved as a transmission resource of the PRS. After receiving the DCI, the terminal device performs rate matching or puncturing on the PRS.

In an embodiment of the present disclosure, the downlink control information DCI provided in this embodiment of the present disclosure may be DCI used to schedule the PDSCH, or group-common DCI.

In an embodiment of the present disclosure, the network side device may further transmit a first message to the terminal device, where the first message may include configuration information of the PRS.

In an embodiment of the present disclosure, the first message may include: a physical broadcast channel (PBCH) or system information (SI) or DCI.

In an embodiment of the present disclosure, the configuration information of the PRS may be located in a field of the PBCH, or in a code point of a specific field of the PBCH.

In an embodiment of the present disclosure, the configuration information of the PRS may include: PRS-occupied time-frequency resource information, PRS identification information, PRS power information, a PRS quasi co-location (QCL) relationship, PRS position information, a serving cell configuration, and a neighboring cell configuration.

In an embodiment of the present disclosure, the PRS-occupied time-frequency resource information may include: at least one of a quantity of ports occupied by a PRS, a density occupied by a PRS, an OFDM symbol (a position in a slot or a position relative to a synchronization signal block (SSB)) occupied by a PRS, a start RE position of a PRS in an RB, an RE offset between OFDM symbols, a bandwidth occupied by a PRS, a quantity of RBs occupied by a PRS, a set of RBs occupied by a PRS, or a start RB position of a PRS (for example, an RB offset relative to an SSB).

In an embodiment of the present disclosure, the PRS-occupied time-frequency resource information may further include: a PRS period, PRS transmission occasion information, zero-power PRS information, PRS subcarrier spacing information, and the like.

The PRS occasion information is a quantity of slots occupied by a PRS, and optionally may occupy be a plurality of occupied consecutive slots.

In an embodiment of the present disclosure, the PRS identification information may include: at least one of a sequence identifier (sequence ID), a PRS resource identifier (resource ID), a PRS resource set identifier (resource set ID), a PRS resource setting identifier (resource setting ID), or a cell identifier (cell ID).

In an embodiment of the present disclosure, the PRS power information is, for example, a power offset of a PRS relative to a secondary synchronization Signal (SSS), a power offset of a PRS relative to a PBCH DMRS, and a type of code division multiplexing (CDM).

In an embodiment of the present disclosure, the PRS QCL relationship may include: QCL relationship between a PRS and an SSB, QCL relationship between a PRS and a CSI-RS, QCL relationship between a PRS and a physical downlink control channel (PDCCH) DMRS, a QCL relationship between a PRS and a PDSCH DMRS, and the like.

In an embodiment of the present disclosure, the network side device may instruct the terminal to receive position information of an RE time-frequency resource of a PDSCH on which rate matching or puncturing is to be performed. The PDSCH may be at least one of RMSI, OSI, a paging message, a RAR, or MSG4. The position information of the RE time-frequency resource may be indicated through a PBCH or SI or DCI. When receiving the PDSCH based on the position information of the RE time-frequency resource indicated by the network side device, the terminal performs rate matching or puncturing on the RE resource. In this way, some RE resources are reserved. The RE resources can be used for PRS transmission, or CSI-RS transmission, or transmission of any other RS (such as a zero-power RS). In this way, the network side device can multiplex the PDSCH and these RSs for transmission.

An embodiment of the present disclosure provides an information transmission method applied to a terminal device. The information transmission method applied to the terminal device may include: receiving a PDSCH and a PRS transmitted by a network side device, where the PDSCH and the PRS are mapped onto different REs of a same RB; or the PDSCH and the PRS are mapped onto different RBs; or the PDSCH and the PRS are mapped onto different OFDM symbols.

Optionally, the information transmission method applied to the terminal device and provided in this embodiment of the present disclosure may be applicable to a UFB.

In an embodiment of the present disclosure, transmission content of the PDSCH may include at least one of RMSI, OSI, a paging message, a RAR, or MSG4.

In an embodiment of the present disclosure, the terminal device may receive DCI transmitted by a network side device, where the DCI is used to instruct to perform rate matching or puncturing on an RE or an RB or an OFDM symbol of the PRS. The DCI may be DCI used to schedule the PDSCH, or group-common DCI.

In an embodiment of the present disclosure, the terminal device may receive a first message transmitted by the network side device, where the first message may include configuration information of the PRS.

In an embodiment of the present disclosure, the first message may include a PBCH or SI or DCI.

In an embodiment of the present disclosure, the configuration information of the PRS may be located in a field of the PBCH, or in a code point of a specific field of the PBCH.

In an embodiment of the present disclosure, the configuration information of the PRS may include: PRS-occupied time-frequency resource information, PRS identification information, PRS power information, a PRS QCL relationship, PRS position information, a serving cell configuration, and a neighboring cell configuration.

In an embodiment of the present disclosure, the PRS-occupied time-frequency resource information may include: at least one of a quantity of ports occupied by a PRS, a density occupied by a PRS, an OFDM symbol (a position in a slot or a position relative to an SSB) occupied by a PRS, a start RE position of a PRS in an RB, an RE offset between OFDM symbols, a bandwidth occupied by a PRS, a quantity of RBs occupied by a PRS, a set of RBs occupied by a PRS, or a start RB position of a PRS (for example, an RB offset relative to an SSB).

In an embodiment of the present disclosure, the PRS-occupied time-frequency resource information may further include: a PRS period, PRS occasion information, zero-power PRS information, PRS subcarrier spacing information, and the like.

The PRS occasion information is a quantity of slots occupied by a PRS, and optionally may occupy be a plurality of occupied consecutive slots.

In an embodiment of the present disclosure, the PRS identification information may include: at least one of a sequence ID, a PRS resource ID, a PRS resource set ID, or a PRS resource setting ID, and a cell ID.

In an embodiment of the present disclosure, the PRS power information is, for example, a power offset of a PRS relative to an SSS, a power offset of a PRS relative to a PBCH DMRS, and a type of CDM.

In an embodiment of the present disclosure, the PRS QCL relationship may include: QCL relationship between a PRS and an SSB, QCL relationship between a PRS and a CSI-RS, QCL relationship between a PRS and a PDCCH DMRS, a QCL relationship between a PRS and a PDSCH DMRS, and the like.

In an embodiment of the present disclosure, the terminal device may use the default PRS configuration information, for example, default time-frequency resource information, a default PRS period, default PRS occasion information, default PRS muting information, and default PRS subcarrier spacing information. For example, a subcarrier spacing of a PRS is the same as that of the SSB, CSI-RS, PDCCH, or PDSCH.

Figure 2:
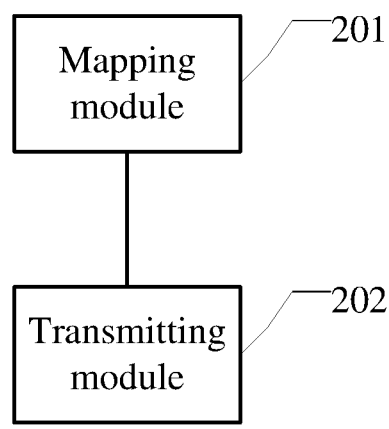
FIG. 2 is a schematic structural diagram of an information transmission apparatus applied to a network side device according to an embodiment of the present disclosure.

Corresponding to the foregoing method embodiment, an embodiment of the present disclosure further provides an information transmission apparatus applied to a network side device. FIG. 2 is a schematic structural diagram of an information transmission apparatus applied to a network side device according to an embodiment of the present disclosure. The information transmission apparatus applied to the network side device may include:

- a mapping module 201, configured to map a PDSCH and a PRS onto different REs of a same RB; or map the PDSCH and the PRS onto different RBs; or map the PDSCH and the PRS onto different OFDM symbols; and
- a transmission module 202, configured to transmit the PDSCH and the PRS to a terminal device.

In an embodiment of the present disclosure, the transmission module 202 may be further configured to:

transmit DCI to the terminal device, where the DCI is used to instruct the terminal device to perform rate matching or puncturing on an RE or an RB or an OFDM symbol of the PRS.

In an embodiment of the present disclosure, the DCI may be DCI used to schedule the PDSCH, or group-common DCI.

In an embodiment of the present disclosure, the transmission module 202 may be further configured to:
    transmit a first message to the terminal device, where the first may include configuration information of the PRS.

In an embodiment of the present disclosure, the configuration information may include:
    at least one of PRS-occupied time-frequency resource information, PRS identification information, PRS power information, a PRS QCL relationship, PRS position information, a serving cell configuration, or a neighboring cell configuration.

In an embodiment of the present disclosure, the PRS-occupied time-frequency resource information may include:
    at least one of a quantity of ports occupied by a PRS, a density occupied by a PRS, an OFDM symbol occupied by a PRS, a start RE position of a PRS in an RB, an RE offset between OFDM symbols, a bandwidth occupied by a PRS, a quantity of RBs occupied by a PRS, a set of RBs occupied by a PRS, or a start RB position of a PRS.

In an embodiment of the present disclosure, the first message may include:
    a PBCH or SI or DCI.

In an embodiment of the present disclosure, transmission content of the PDSCH may include:
    at least one of RMSI, OSI, a paging message, a RAR, or MSG4.

In an embodiment of the present disclosure, optionally, the information transmission apparatus applied to the network side device and provided in this embodiment of the present disclosure may be applicable to a UFB.

An embodiment of the present disclosure further provides an information transmission apparatus applied to a terminal device. The information transmission apparatus applied to the terminal device may include:
    a receiving module, configured to receive a PDSCH and a PRS transmitted by a network side device, where the PDSCH and the PRS are mapped onto different REs of a same RB; or the PDSCH and the PRS are mapped onto different RBs; or the PDSCH and the PRS are mapped onto different OFDM symbols.

In an embodiment of the present disclosure, the receiving module may be further configured to:
    receive DCI transmitted by a network side device, where the DCI is used to instruct to perform rate matching or puncturing on an RE or an RB or an OFDM symbol of the PRS.

In an embodiment of the present disclosure, the DCI may be DCI used to schedule the PDSCH, or group-common DCI.

In an embodiment of the present disclosure, the receiving module may be further configured to:
    receive a first message transmitted by the network side device, where the first message may include configuration information of the PRS.

In an embodiment of the present disclosure, the configuration information may include:
    at least one of PRS-occupied time-frequency resource signal, PRS identification information, PRS power information, a PRS QCL relationship, PRS position information, a serving cell configuration, or a neighboring cell configuration.

In an embodiment of the present disclosure, the PRS-occupied time-frequency resource information may include:
    at least one of a quantity of ports occupied by a PRS, a density occupied by a PRS, an OFDM symbol occupied by a PRS, a start RE position of a PRS in an RB, an RE offset between OFDM symbols, a bandwidth occupied by a PRS, a quantity of RBs occupied by a PRS, a set of RBs occupied by a PRS, or a start RB position of a PRS.

In an embodiment of the present disclosure, the first message may include:
    a PBCH or SI or DCI.

In an embodiment of the present disclosure, transmission content of the PDSCH may include:
    at least one of RMSI, OSI, a paging message, a RAR, or MSG4.

In an embodiment of the present disclosure, optionally, the information transmission apparatus applied to the terminal device and provided in this embodiment of the present disclosure may be applicable to a UFB.

In an embodiment of the present disclosure, the information transmission apparatus applied to the terminal device further may include:
    a positioning module, configured to perform positioning based on the PRS; and
    a processing module, configured to perform data processing based on the PDSCH.

Figure 3:
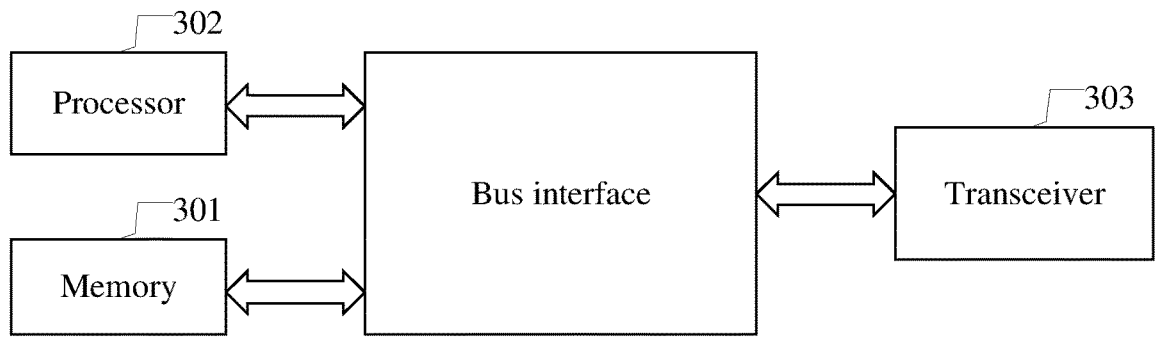
FIG. 3 is a schematic diagram of a hardware structure of a network side device according to an embodiment of the present disclosure.

FIG. 3 is a schematic diagram of a hardware structure of a network side device according to an embodiment of the present disclosure. The network side device includes a memory 301, a processor 302, a transceiver 303, and a computer program stored in the memory 301 and executable on the processor 302.

The processor 302 may be configured to map a PDSCH and a PRS onto different REs of a same RB; or map the PDSCH and the PRS onto different RBs; or map the PDSCH and the PRS onto different OFDM symbols.

The transceiver 303 may be configured to transmit the PDSCH and the PRS to a terminal device.

In FIG. 3, a bus architecture may include any quantity of interconnected buses and bridges, which are connect together one or more processors represented by the processor 302 and various circuits of a memory represented by the memory 301. The bus architecture may further connect together various other circuits of a peripheral device, a voltage stabilizer, a power management circuit, and the like, which are known in this art and will not be further described herein. The bus interface provides an interface. The transceiver 303 may be a plurality of elements, including a transmitter and a receiver, provides a unit for communicating with various other devices on a transmission medium, and is configured to receive and send data under control of the processor 302. The processor 302 is responsible for management on and general processing of the bus architecture. The memory 301 may store data used by the processor 302 during operation execution.

Optionally, an embodiment of the present disclosure further provides a network side device, including a processor 302, a memory 301, a computer program stored in the memory 301 and executable on the processor 302. When the computer program is executed by the processor 302, processes of the information obtaining method embodiment applied to the network side device are implemented, and a same technical effect can be achieved. To avoid repetition, details are not described herein again.

Figure 4:
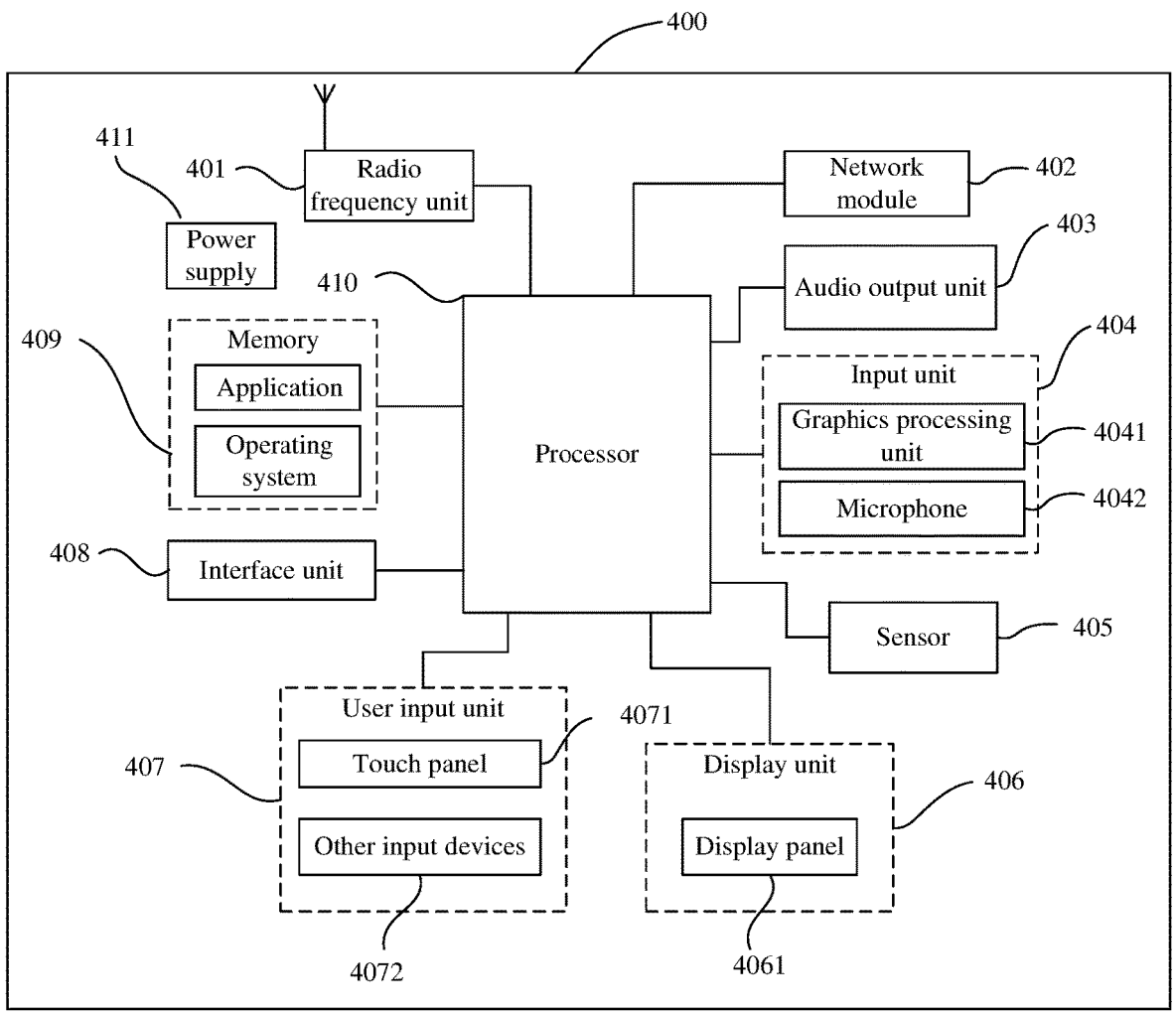
FIG. 4 is a schematic diagram of a hardware structure of a terminal device according to an embodiment of the present disclosure.

FIG. 4 is a schematic diagram of a hardware structure of a terminal device according to an embodiment of the present disclosure. The terminal device 400 includes but is not limited to: a radio frequency unit 401, a network module 402, an audio output unit 403, an input unit 404, a sensor 405, a display unit 406, a user input unit 407, an interface unit 408, a memory 409, a processor 410 and a power supply 411. A person skilled in the art may understand that the structure of the terminal device shown in FIG. 4 does not constitute a limitation to the terminal device. The terminal device may include more or fewer components than that shown in the figure, or a combination of some components, or an arrangement of different components. In this embodiment of the present disclosure, the terminal device includes but is not limited to: a mobile phone, a tablet computer, a notebook computer, a palmtop computer, an in-vehicle terminal, a wearable device, a pedometer, or the like.

The radio frequency unit 401 is configured to receive a PDSCH and a PRS transmitted by a network side device, where the PDSCH and the PRS are mapped onto different REs of a same RB; or the PDSCH and the PRS are mapped onto different RBs; or the PDSCH and the PRS are mapped onto different OFDM symbols.

It should be understood that in this embodiment of the present disclosure, the radio frequency unit 401 may be configured to receive and transmit information, or receive and transmit a signal during a call. For example, the radio frequency unit 401 receives downlink data from a base station, and then transmits the downlink data to the processor 410 for processing; and in addition, transmits uplink data to the base station. Generally, the radio frequency unit 401 includes but is not limited to, an antenna, at least one amplifier, a transceiver, a coupler, a low noise amplifier, a duplexer, and the like. In addition, the radio frequency unit 401 further may communicate with a network and another device through a wireless communications system.

The terminal device provides a user with wireless broadband internet access by using the network module 402, for example, helping the user receive and send an email, browse a web page, and access streaming media.

The audio output unit 403 may convert audio data received by the radio frequency unit 401 or the network module 402 or stored in the memory 409 into an audio signal and output the audio signal as a sound. Moreover, the audio output unit 403 may also provide an audio output (such as a receiving sound of a calling signal, a message receiving sound and the like) related to a specific function executed by the terminal device 400. The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 processes image data of a static picture or a video obtained by an image capturing apparatus (for example, a camera) in a video capturing mode or an image capturing mode. A processed image frame can be displayed on the display unit 406. An image frame processed by the graphics processing unit 4041 may be stored in the memory 409 (or another storage medium) or sent via the radio frequency unit 401 or the network module 402. The microphone 4042 can receive a sound, and can process such a sound to obtain audio data. Processed audio data may be converted, in a telephone call mode, into a format that can be sent to a mobile communication base station via the radio frequency unit 401 for output.

The terminal device 400 further includes at least one sensor 405, such as an optical sensor, a motion sensor, and other sensors. For example, the light sensor includes an ambient light sensor and a proximity sensor. The ambient light sensor may adjust luminance of the display panel 4061 based on brightness of ambient light, and the proximity sensor may turn off the display panel 4061 and/or backlight when the terminal device 400 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein.

The display unit 406 is configured to display information entered by the user or information provided for the user. The display unit 406 may include the display panel 4061, and the display panel 4061 may be configured in a form of a liquid crystal display (LCD), an organic light-emitting diode (OLED), or the like.

The user input unit 407 may be configured to receive input digit or character information and generate key signal input related to user settings and function control of the terminal device. For example, the user input unit 407 includes a touch panel 4071 and other input devices 4072. The touch panel 4071, also referred to as a touchscreen, can collect a touch operation performed by a user on or near the touch panel 4071 (such as an operation on or near the touch panel 4071 performed by a user by using any suitable object or accessory such as a finger or a stylus). The touch panel 4071 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, and sends the touch point coordinates to the processor 410; and receives and executes a command sent by the processor 410. In addition, the touch panel 4071 may be implemented as a resistive type, a capacitive type, an infrared type, a surface acoustic wave type, or the like. In addition to the touch panel 4071, the user input unit 407 may further include other input devices 4072. Other input devices 4072 may include but are not limited to at least one of a physical keyboard, a functional button (such as a volume control button or a power on/off button), a trackball, a mouse, or a joystick. Details are not described herein.

Optionally, the touch panel 4071 can cover the display panel 4061. When detecting a touch operation on or near the touch panel 4071, the touch panel 4071 transmits the touch operation to the processor 410 to determine a type of a touch event. Then, the processor 410 provides corresponding visual output on the display panel 4061 based on the type of the touch event. Although the touch panel 4071 and the display panel 4061 are used as two separate components to implement input and output functions of the terminal device in FIG. 4, in some embodiments, the touch panel 4071 and the display panel 4061 may be integrated to implement the input and output functions of the terminal device. This is not specifically limited herein.

The interface unit 408 is an interface for connecting an external apparatus to the terminal device 400. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 408 may be configured to receive an input (for example, data information or power) from the external apparatus and transmit the received input to one or more elements in the terminal device 400, or transmit data between the terminal device 400 and the external device.

The memory 409 may be configured to store a software program and various data. The memory 409 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 409 may include a high-speed random access memory, or may include a nonvolatile memory, for example, at least one disk storage device, a flash memory, or another volatile solid-state storage device.

The processor 410 is a control center of the terminal device, and is connected to various parts of the entire terminal device by using various interfaces and lines, and performs various functions of the terminal device and processes data by running or executing the software program and/or modules stored in the memory 409 and invoking the data stored in the memory 409, to implement overall monitoring on the terminal device. The processor 410 may include one or more processing units. Optionally, an application processor and a modem processor may be integrated into the processor 410. The application processor mainly processes an operating system, a user interface, an application program, and the like. The modem processor mainly processes wireless communications. It should be understood that the modem processor may be not integrated in the processor 410.

The terminal device 400 may further include the power supply 411 (such as a battery) that supplies power to each component. Optionally, the power supply 411 may be logically connected to the processor 410 by using a power management system, to implement functions such as charging, discharging, and power consumption management by using the power management system.

In addition, the terminal device 400 includes some functional modules that are not shown. Details are not described herein.

Optionally, an embodiment of the present disclosure further provides a terminal device, including a processor 410, a memory 409, and a computer program stored in the memory 409 and executable on the processor 410. When the computer program is executed by the processor 410, processes of the foregoing information transmission method embodiment applied to the terminal device are implemented, and a same technical effect can be achieved. To avoid repetition, details are not described herein again.

An embodiment of the present disclosure further provides a non-transitory computer-readable storage medium. The non-transitory computer-readable storage medium stores computer program instructions. When the computer program instructions are executed by a processor, processes of the information transmission method embodiment applied to the terminal device and provided in the embodiments of the present disclosure are implemented, or processes of the information transmission method embodiment applied to the network side device are implemented, and a same technical effect can be achieved. To avoid repetition, details are not described herein again. The non-transitory computer-readable storage medium may include, for example, a read-only memory (ROM), a random access memory (RAM), a magnetic disk, or an optical disc.

Various aspects of the present disclosure are described with reference to the flowcharts and/or block diagrams of the method, the apparatus (system) and the computer program product in the embodiments of the present invention. It should be understood that each block in the flowcharts and/or block diagrams and a combination of blocks in the flowcharts and/or block diagrams can be implemented by the computer program instructions. Those computer program instructions can be provided to a processor of a general-purpose computer, a special-purpose computer, an embedded processor, or another programmable data processing apparatus to generate a machine, so that the instructions executed by the processor of the computer or another programmable data processing apparatus are enabled to implement functions/actions specified in one or more blocks of the flowcharts and/or block diagrams. Such a processor may be, but is not limited to, a general-purpose processor, a special-purpose processor, an application-specific processor, or a field programmable logic circuit. It can be further understood that each block in the flowcharts and/or block diagrams and a combination of blocks in the flowcharts and/or block diagrams may alternatively be implemented by dedicated hardware that performs a specified function or action, or implemented by a combination of dedicated hardware and computer instructions.

It should be noted that although the foregoing embodiments are already described in this specification, the protection scope of the present disclosure is not limited thereto. Therefore, based on the innovative ideas of the present disclosure, changes and modifications made to the embodiments described herein, or equivalent structures or equivalent process transformations made by using the content of the specification and accompanying drawings of the present disclosure, and direct or indirect application of the foregoing technical solutions to other related technical fields are all included in the protection scope of the present disclosure.

What is claimed is:

1. An information transmission method, comprising:
    mapping a physical downlink shared channel (PDSCH) and a positioning reference signal (PRS) onto different orthogonal frequency division multiplexing (OFDM) symbols;
    transmitting the PDSCH and the PRS to a terminal device; and
    transmitting downlink control information (DCI) to the terminal device, wherein the DCI is used to instruct the terminal device to perform rate matching on an OFDM symbol of the PRS.

2. The method according to claim 1, wherein the downlink control information comprises:
    DCI used to schedule the PDSCH, or group-common DCI.

3. The method according to claim 1, wherein the method further comprises:
    transmitting a first message to the terminal device, wherein the first message comprises configuration information of the PRS.

4. The method according to claim 3, wherein the configuration information comprises:
    PRS-occupied time-frequency resource information, PRS identification information, PRS power information, a PRS quasi co-location (QCL) relationship, PRS position information, a serving cell configuration, and a neighboring cell configuration.

5. The method according to claim 4, wherein the PRS-occupied time-frequency resource information comprises:
   at least one of a quantity of ports occupied by a PRS, a density occupied by a PRS, an OFDM symbol occupied by a PRS, a start RE position of a PRS in an RB, an RE offset between OFDM symbols, a bandwidth occupied by a PRS, a quantity of RBs occupied by a PRS, a set of RBs occupied by a PRS, or a start RB position of a PRS.

6. The method according to claim 3, wherein the first message comprises:
   a physical broadcast channel (PBCH), system information (SI), or downlink control information (DCI).

7. The method according to claim 1, wherein transmission content of the PDSCH comprises:
   at least one of remaining minimum system information (RMSI), other system information (OSI), a paging message, a random access response (RAR), or fourth signaling (MSG4) in contention-based random access.

8. A network side device, comprising a memory, a processor, and a computer program stored in the memory and executable on the processor, wherein the computer program, when executed by the processor, causes the network side device to perform:
   mapping a physical downlink shared channel (PDSCH) and a positioning reference signal (PRS) onto different orthogonal frequency division multiplexing (OFDM) symbols;
   transmitting the PDSCH and the PRS to a terminal device; and
   transmitting downlink control information (DCI) to the terminal device, wherein the DCI is used to instruct the terminal device to perform rate matching on an OFDM symbol of the PRS.

9. The network side device according to claim 8, wherein the computer program, when executed by the processor, causes the network side device to further perform:
   transmitting a first message to the terminal device, wherein the first message comprises configuration information of the PRS.

10. A terminal device, wherein the terminal device comprises: a memory, a processor, and a computer program stored in the memory and executable on the processor; and the computer program, when executed by the processor, causes the terminal device to perform:
    receiving a physical downlink shared channel (PDSCH) and a positioning reference signal (PRS) transmitted by a network side device, wherein the PDSCH and the PRS are mapped onto different orthogonal frequency division multiplexing (OFDM) symbols; and
    receiving downlink control information (DCI) transmitted by the network side device, wherein the DCI is used to instruct to perform rate matching on an OFDM symbol of the PRS.

11. The terminal device according to claim 10, wherein the downlink control information comprises:
    DCI used to schedule the PDSCH, or group-common DCI.

12. The terminal device according to claim 10, wherein the computer program, when executed by the processor, causes the terminal device to further perform:
    receiving a first message transmitted by the network side device, wherein the first message comprises configuration information of the PRS.

13. The terminal device according to claim 12, wherein the configuration information comprises:
    PRS-occupied time-frequency resource information, PRS identification information, PRS power information, a PRS quasi co-location (QCL) relationship, PRS position information, a serving cell configuration, and a neighboring cell configuration.

14. The terminal device according to claim 13, wherein the PRS-occupied time-frequency resource information comprises:
    at least one of a quantity of ports occupied by a PRS, a density occupied by a PRS, an OFDM symbol occupied by a PRS, a start RE position of a PRS in an RB, an RE offset between OFDM symbols, a bandwidth occupied by a PRS, a quantity of RBs occupied by a PRS, a set of RBs occupied by a PRS, or a start RB position of a PRS.

15. The terminal device according to claim 12, wherein the first message comprises:
    a physical broadcast channel (PBCH), system information (SI), or downlink control information (DCI).

16. The terminal device according to claim 10, wherein transmission content of the PDSCH comprises:
    at least one of remaining minimum system information (RMSI), other system information (OSI), a paging message, a random access response (RAR), or fourth signaling (MSG4) in contention-based random access.

17. The network side device according to claim 9, wherein the configuration information comprises:
    PRS-occupied time-frequency resource information, PRS identification information, PRS power information, a PRS quasi co-location (QCL) relationship, PRS position information, a serving cell configuration, and a neighboring cell configuration.

* * * * *